United States Patent [19]

Snead

[11] 3,921,128
[45] Nov. 18, 1975

[54] TRUCK ROLL WARNING SYSTEM
[76] Inventor: Edwin deS. Snead, Box 798, Georgetown, Tex. 78626
[22] Filed: May 28, 1974
[21] Appl. No.: 473,511

[52] U.S. Cl. ............... 340/52 H; 180/104; 340/53; 340/282
[51] Int. Cl.² .................. B60Q 5/00; G08B 21/00
[58] Field of Search.. 340/52 H, 282, 267 R, 267 C, 340/53; 180/104; 298/22 C, 17 S, 1 R; 280/6 R

[56] References Cited
UNITED STATES PATENTS

| | | |
|---|---|---|
| 3,464,755 | 9/1969 | Brown .................................. 340/53 |
| 3,640,578 | 2/1972 | Finney ................................ 298/17 S |

Primary Examiner—Glen R. Swann, III
Attorney, Agent, or Firm—Peter J. Murphy

[57] ABSTRACT

A warning safety system, responsive to the angle of lateral roll or tilt of a truck or trailer having a hydraulically operated dumping bed, includes a switch unit mounted on the dump bed responsive to a predetermined angle of tilt with the bed in the normal transport position and to a second predetermined angle of tilt when the bed is in the raised position where the center of gravity of the dumping vehicle is inherently higher. The switch actuates a warning signal device and a safety valve for lowering the bed.

5 Claims, 8 Drawing Figures

3,921,128

TRUCK ROLL WARNING SYSTEM

BACKGROUND AND SUMMARY OF THE INVENTION

This invention relates to a safety system for vehicles such as dump trucks, or for tractor-trailer units where the trailer has a dumping bed, to provide warning when the unit is approaching an unsafe angle of lateral tilt or toll; and more particularly to a system providing a warning to the operator for such condition and also effecting the immediate lowering of a raised dump bed.

The expression "dump trucks" is used herein to identify unitary vehicles having a dumping bed and also tractor-trailer units wherein the trailer includes a dumping bed. Such dump trucks are exposed to hazards not common to other types of trucks in that they are frequently required to traverse uneven or soft ground. Such trucks usually have an inherently high center of gravity, in view of the heavy chassis or under carriage necessary to support the heavy loads carried by these vehicles; and the center of gravity is elevated further when the bed is loaded. It is desirable then to have a warning system which will provide a warning signal to the truck operator to indicate when the truck is approaching a dangerous tilt condition while carrying a load. Should the truck roll over there is of course the damage to the equipment to consider as well as possible injury to the operator, but of greater concern is the possible injury to other workers who may be in the area of the overturned vehicle. These trucks of course frequently operate on a construction site where there are many workers in the area who might be injured by such an accident.

The danger of roll over is even greater of course when the truck bed is raised to the dump position; and this condition would be particularly aggravated should the tailgate or discharge chute fail to function so that the load does not discharge properly. The danger point for a vehicle with an elevated dump bed will occur at a lesser angle of tilt of course than it would for the situation where the bed is in the lowered position. It is desirable therefore to have a warning system which will not only warn the operator by means of some form of signal when the danger situation is approaching with the raised bed, but also to automatically lower the bed to alleviate the dangerous condition.

Since the dump truck will be able to negotiate ground with a greater degree of unevenness with the bed lowered, than with the bed raised, it is desirable to provide a warning system which will be responsive to at least two different conditions of hazard, namely with the bed raised or with the bed lowered.

A principal object of this invention is to provide a safety system for a dump truck to warn the operator of an approaching dangerous tilt condition for at least two different operating situations, namely with the bed lowered and with the bed raised.

Another object of this invention is to provide such a safety system for a dump truck with a raised bed which would not only warn the operator but will automatically lower the bed to alleviate the dangerous condition.

A further object of this invention is to provide a safety system which will prevent the raising of the dump bed in the event that the angle of lateral tilt is too great for safe operation.

These objects are accomplished in a system functioning in a vehicle having a dump bed, having a single acting, extensible hydraulic cylinder for raising and lowering the dump bed, and having a hydraulic system including a reservoir and power pump for extending the cylinder to raise the bed. The system includes an electrically operated signal device, and a control circuit for the signal device including a switch unit responsive to lateral tilt of the vehicle. The switch unit includes a housing which defines a vertical reference plane and a horizontal reference plane, with a pair of elongated, linear mercury switch tubes being supported in the housing parallel to the vertical reference plane and being oppositely inclined at a selected angle relative to the horizontal reference plane. This switch unit is mounted on the bed in a manner that, when the bed is at its lowermost position, the switch unit vertical reference plane is generally perpendicular to the longitudinal axis of the vehicle, and the switch unit horizontal reference plane is disposed parallel to the vehicle supporting surface. Each switch tube is responsive to lateral tilt of the vehicle at an angle greater than the selected angle of the tube, in a respective direction, to actuate the signal device. The selected angle for the tubes in the lowermost position of the bed is less than the critical angle of tilt for the vehicle with the bed in this position; and as the bed is raised the angle of the tube decreases so that the system will respond to a lesser angle of tilt or roll when the bed is raised.

In greater detail, the system includes a safety valve in an associated bypass circuit for selectively venting the dump bed cylinder to the reservoir for lowering the bed, with the safety valve being solenoid actuated; and the solenoid actuator is controlled by the control circuit.

The novel features and the advantages of the invention as well as additional objects thereof, will be understood more fully from the following description when read in connection with the accompanying drawings.

DRAWINGS

DESCRIPTION OF THE PREFERRED EMBODIMENT

Figure 1:
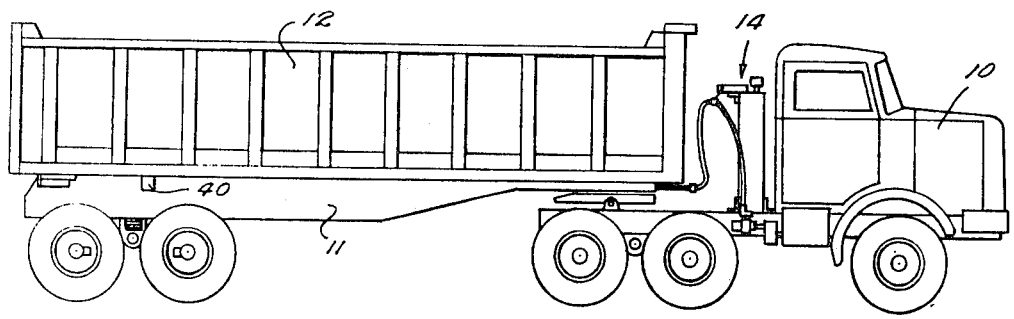
FIG. 1 is a side elevation view of a tractor-trailer unit with the trailer having a dump bed in the lowered position.
Figure 2:
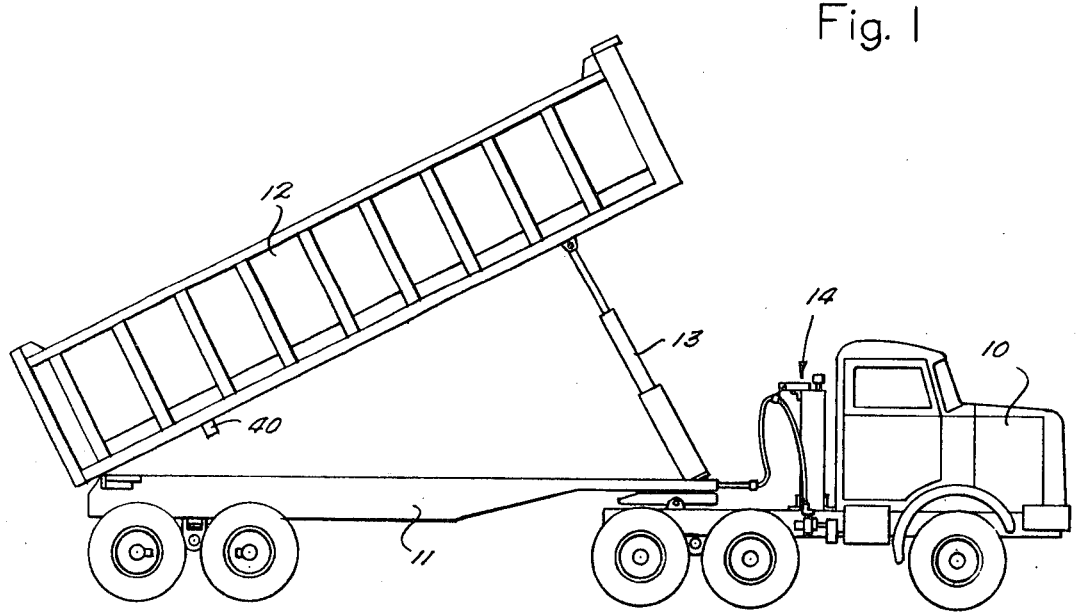
FIG. 2 is a view of the tractor-trailer unit with the dump bed in the raised position.

FIGS. 1 and 2 of the drawing illustrate a dump truck in the form of a tractor-trailer unit including a tractor 10 and a trailer unit consisting of a chassis 11 and a dump bed 12. The rear end of the dump bed is suitably pivotably supported on the chassis, and the front end of the bed is railed by a multisection, single action extensible hydraulic cylinder unit 13 coupled between the chassis and the bed. A hydraulic control unit 14, for operating the cylinder 13, is carried on the tractor 10; and this unit 14 is illustrated diagrammatically in FIG. 4.

Figure 4:
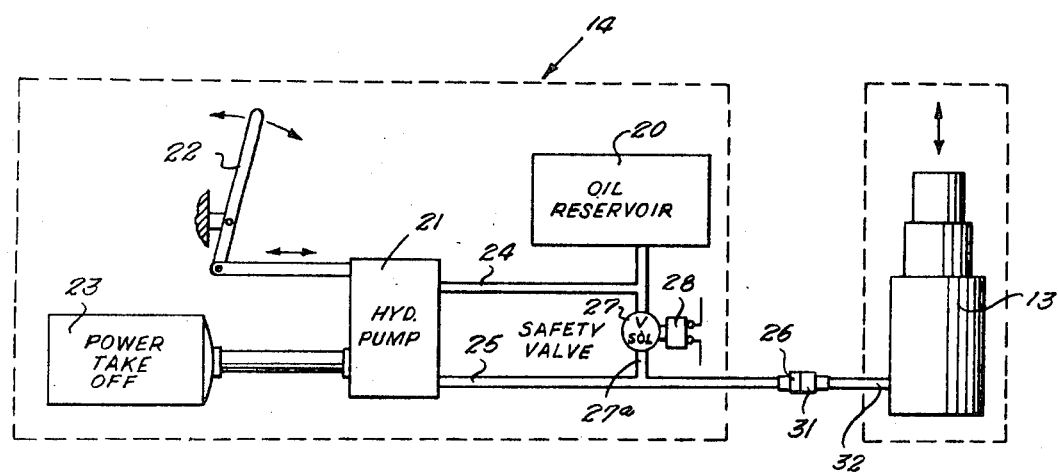
FIG. 4 is a diagrammatic view of a dump bed hydraulic system for the tractor-trailer unit of FIGS. 1 and 2.

Referring to FIG. 4 the control unit 14 includes a hydraulic oil reservoir 20, a hydraulic pump and valve unit 21 including an operating lever 22 for controlling the normal raising and lowering of the bed. The hydraulic pump is powered through a power take off 23 from the tractor engine. The hydraulic pump unit 21 communicates with the oil reservoir 20 through a conduit 24, and with the hydraulic cylinder 13 through a conduit 25 and coupling member 26 which is selectively coupled to a coupling member 31 of cyliner conduit 32.

A solenoid operated safety valve 27 is connected in a bypass circuit 27a, between the conduits 24 and 25; and this valve is controlled by a solenoid actuator 28. Preferably the valve 27 is normally closed, to close the bypass circuit for normal operation, and is opened when its solenoid actuator is energized, as will be described.

Figure 3:
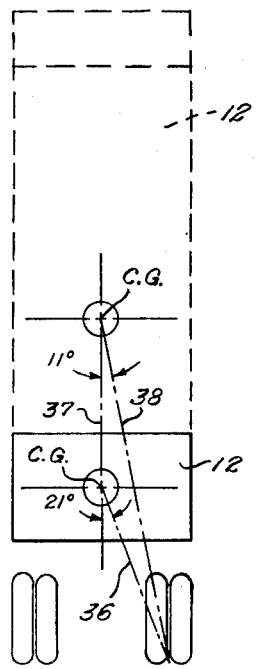
FIG. 3 is a diagrammatic view, from the rear of the trailer of FIGS. 1 and 2, illustrating the centers of gravity for the lowered and raised positions of the dump bed, and the respective critical angles of tilt for the trailer.

FIG. 3 of the drawing is a diagrammatic illustration from the rear of the dump truck, for example, illustrating the truck on level ground, and indicating the center of gravity for the truck (e.g.). The dump bed, in the lowered condition, is illustrated in solid lines; and the dump bed 12 in the raised condition is illustrated in broken lines.

For the lowered position, the broken line 36 is an imaginary line drawn between the center of gravity and the point of support for the trailer wheels on one side; this line being at an angle of 21° relative to a vertical plane through the center of gravity indicated by the broken line 37. The broken line 36 illustrates danger condition for the illustrated truck which would exist when the vertical plane 37 tilts 21° to place the center of gravity directly over the support wheels, meaning that the dump truck has rolled or tilted 21° in this example. Since a tilt of 21° is the point at which the truck is conditioned for roll over, a warning system should alert the operator at some considerably lesser angle of tilt such as 8° for example.

The broken line 38 in FIG. 3 illustrates a line between the vehicle center of gravity, in the raised condition of the bed, and the point of support for the wheels on one side, and indicates that when the truck has tilted 11 degrees from horizontal under these circumstances, it is conditioned for roll over. Accordingly a warning system should be set to warn the operator of this situation when the truck approaches some considerably lesser degree of tilt such as 5° for example.

Figure 6:
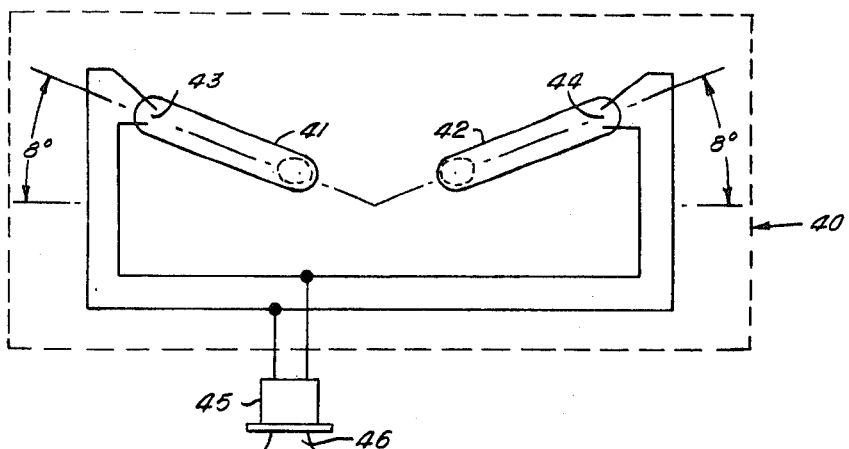
FIG. 6 is a diagrammatic side view of the mercury switches for the lowered position.
Figure 6:
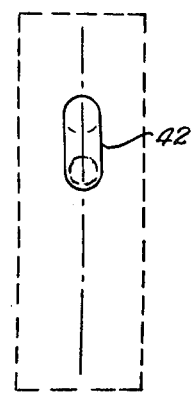
Figure 5:
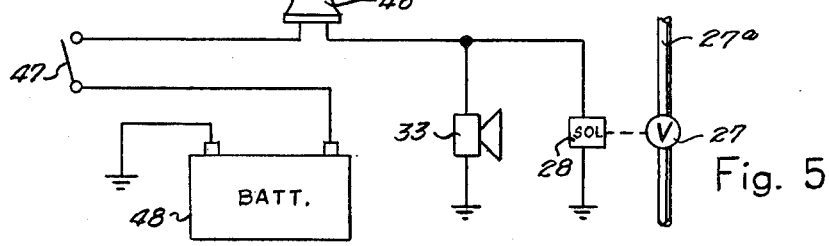
FIG. 5 is a schematic diagram of the control circuit for the system, including mercury switches in the orientation for the lowered position of the dump bed.
Figure 7:
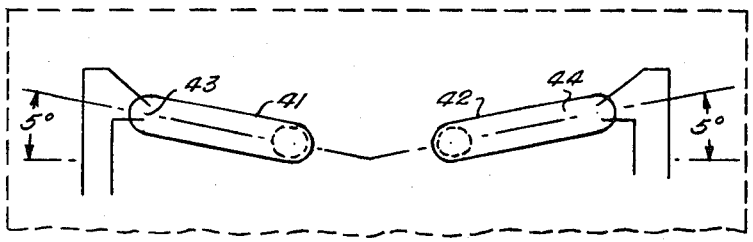
FIGS. 7 and 8 are respective front and side views of the mercury switches of the control circuit in the orientation for the raised position of the dump bed.
Figure 8:
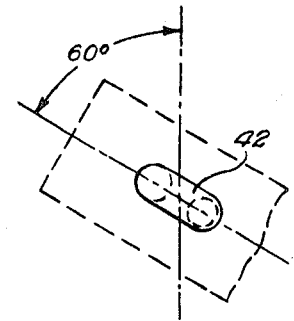

FIGS. 5 through 8 illustrate diagrammatically a tilt responsive switch unit 40 and associated control circuitry in relation to other described system components, for energizing the above mentioned solenoid actuator 28 for the valve 27 and for actuating a signal horn 33. The horn 33 may be a special horn or may be the conventional warning horn of the vehicle. The switch unit 40 is packaged in a suitable housing of sufficient ruggedness for attachment at some protected location on the dump bed 12, with the housing defining a vertical reference plane and a horizontal reference plane. The switch unit is rigidly attached to the dump bed to be responsive to the different positions of the dump bed, with the vertical reference plane preferably disposed in a plane perpendicular to the longitudinal axis of the vehicle with the bed in lowermost position, and with the horizontal reference plane disposed parallel with the vehicle supporting surface when the bed is in the lowermost position. FIGS. 5 and 6 illustrate the condition of the switch unit for the lowered position of the dump bed; while FIGS. 7 and 8 illustrate the switch unit condition for the raised position of the dump bed.

FIG. 5 illustrates the switch unit as viewed from the rear of the bed, for example, the switch unit including two elongated tubes 41 and 42 defining mercury switches. The tubes are rigidly mounted within the unit housing 40 and disposed in one or more planes parallel to the vertical reference plane. In FIGS. 5 and 6 the tubes are shown in a common plane; but it will be apparent that the tubes could overlie each other in parallel planes. Further, the tubes are disposed so that one tube is inclined at an angle of 8° to the horizontal reference plane, in one direction, while the other tube is inclined at an angle of 8° relative to the horizontal reference plane in the other direction. Visualizing the tubes in FIG. 5 as being viewed from the rear of the dump truck, the switch tube 41 is responsive to the roll of the truck to the left and the switch unit 42 is responsive to roll of the truck to the right.

The upper ends of the switch tubes 41 and 42 are provided with respective open contact pairs 43 and 44, which are connected by suitable conductors parallel with each other and in series with a trailer connector element 45. A mating tractor connector element 46 is connected in series with a master switch 47 and a battery power source such as the conventional tractor battery 48; and the valve operator solenoid 28 and the warning horn 33 are connected in parallel in this circuit.

The master switch 47 may be a manual switch provided, for example, to deactivate the system when desired or to otherwise prevent operation of the system when it is not desired. This master switch may be for example a normally closed relay operated switch which is closed by the ignition switch of the vehicle so that the system is activated only when the ignition switch is on. Alternatively, this master switch may be a normally open relay operated switch which is responsive to some function of the bed dumping control system.

Alternatively, a signal light may also be connected in the circuit, in parallel with the horn 33 for example, to provide an additional visual warning device; and of course other types of visible or audible signal devices may be provided to be energized by this circuit.

Operation

The operation of the system will now be described in connection with the above described circuit; assuming of course that the switch unit is mounted on the truck bed as described, and that the master switch 47 is closed to activate the system. With the dump bed in the lowered position, if the dump truck rolls to the left in excess of 8°, the mercury switch 41 will make the contact pair 43 to energize the actuator solenoid 28 and to energize signal horn 33; and the energizing of the horn will alert the driver to a potentially dangerous condition so that he may seek a more level path for the truck. Similarly if the dump truck rolls to the right in execss of 8°, the solenoid and horn will be energized in the same manner through the mercury switch 42. The energizing of the solenoid actuator 28 will open the valve 27 but this will have no effect.

When the dump bed is raised to an angle of 60°, for example, the planes of the switch tubes will be tilted 60° as illustrated in FIG. 8; and this will have the effect of producing a shallower angle of inclination of the switch tubes 41 and 42 relative to a horizontal plane as illustrated in FIG. 7. In the example of the drawings, the angles of inclination of the switch tubes relative to a horizontal plane will be 5°. This of course will be the angle when the truck bed is in this maximum elevated position of 60°; and it will be apparent that for all intermediate angles of elevation of the truck bed there will be a corresponding intermediate angles of inclination of the switch tubes. The switch tubes will then function in an identical manner for truck roll either to the left or to the right, with the exception that the circuits will be energized in response to a roll of only 5° for the maximum elevational position of the dump bed instead of 8°, as described above.

In this raised condition of the bed, when the solenoid 28 is energized the valve 27 is opened to open the bypass circuit 27a between the hoist cylinder 13 and oil reservoir 20 permitting the oil to flow from the cylinder and lower the dump bed to alleviate the danger conditions; and this of course occurs simultaneously with the sounding of the warning horn 33. This lowering of the dump bed will occur even though the hydraulic pump is operating.

In the same manner, should the dump truck be tilted at an angle in excess of 5° prior to raising the dump bed, the valve 27 will be opened by the solenoid 28 so that it will be impossible to raise the dump bed through the operation of the hydraulic pump 21.

It will be appreciated that where the above described switch unit 40 is mounted on the truck bed in the manner that the horizontal reference plane is exactly parallel to the vehicle supporting surface, the angle to which the switch unit responds with the truck bed lowered will be exactly 8° relative to the horizontal; and the angle to which the switch unit responds with the truck bed elevated will be a function of this 8° tube angle in relation to the angle of elevation of the bed in the raised position.

It will be appreciated, also, that the angles of response can be changed if the switch unit 40 is designed in a manner that it may be adjustably mounted on the truck bed; that is that it may be rotated about an axis defined for example by the intersection of the above described vertical and horizontal reference planes of the switch unit. Such rotation of the switch unit would produce a smaller response angle with the bed in the lowered condition; and would produce simultaneously a changed response angle at the maximum raised condition of the bed, which change may be to either a smaller angle or a larger angle depending on the direction of rotation of the switch unit.

What has been described is a novel improved warning system for a dump truck which detects a potentially dangerous degree of roll or tilt of the truck when the dump bed is in the lowered position, to enable full and safe use of the truck in this condition over rough terrain; and which detects a smaller angle of roll or tilt when the bed is in the raised position to assure safe operation in this condition. The system also is responsive to different intermediate conditions of dump bed elevation, which of course change the height of the center of gravity. With this system, which detects varying conditions of the center of gravity, the operation of the dump truck will be under safe conditions at all times, and this will enable maximum utility of the truck with the bed in the lowered condition since the system only responds to the actual danger condition in relation to the bed position.

While the preferred embodiment of the invention has been illustrated and described, it will be understood by those skilled in the art that changes and modifications may be resorted to without departing from the spirit and scope of the invention.

What is claimed is:

1. In a vehicle having a dump bed, a single acting extensible hydraulic cylinder for raising and lowering said dump bed, and a hydraulic system including a reservoir and power pump for extending said cylinder to raise said bed; a warning system comprising:

an electrically operated signal device; a control circuit for said signal device including a switch unit responsive to lateral tilt of said vehicle in either direction;

said switch unit including a housing defining a vertical reference plane and a horizontal reference plane, and a pair of elongated, linear mercury switch tubes supported in said housing parallel to said vertical reference plane and being oppositely inclined at a selected angle relative to said horizontal reference plane;

said switch unit being mounted on said bed to dispose said vertical reference plane in a plane generally perpendicular to the longitudinal axis of the axis of the vehicle and to dispose said horizontal reference plane in a plane generally parallel to the vehicle supporting surface, when said bed is in its lowermost position;

each switch tube being responsive to lateral tilt of the vehicle at an angle greater than a selected horizontal reference angle of the switch tubes, in a respective direction, to actuate said signal device;

the selected reference angles for said tubes in the lowermost position of said bed being less than the critical angle of tilt for the vehicle with the bed in said lowermost position; and the angle of said tubes relative to a horizontal plane decreasing as said bed is raised, to respond to a lesser angle of tilt of the vehicle.

2. The combination set forth in claim 1
   each of said switch tubes having a pair of normally open contacts at its upper end; said contact pairs being connected in parallel with each other, and in series with a power source and said electrically operated signal device, to energize said signal device when either of said pairs of contacts is closed.

3. The combination set forth in claim 1
   auxiliary means for effecting the lowering of said bed; electrically controlled actuator means, for said auxiliary lowering means, connected in said control circuit and being responsive to excessive tilt to effect the immediate lowering of said bed.

4. The combination set forth in claim 1
   wherein said vehicle hydraulic system includes a bypass circuit for said cylinder, and safety valve means in said bypass circuit;
   said warning system including a solenoid actuator for said safety valve means; and said solenoid actuated safety valve being connected in said control circuit and responsive to excessive tilt to effect the immediate lowering of said bed.

5. The combination set forth in claim 4 said safety valve means being a normally closed valve; and said control circuit being effective to energize said solenoid actuator, when said vehicle exceeds a critical roll angle in either direction of roll, to open said valve and bypass circuit.

* * * * *